May 25, 1954 J. W. BARNETT ET AL 2,679,262
CHECK VALVE FOR ABRASIVES
Filed March 18, 1953

INVENTOR.
James W. Barnett
Frederick E. Gillett
by: Regan & Ripnis
attys.

Patented May 25, 1954

2,679,262

UNITED STATES PATENT OFFICE 2,679,262

CHECK VALVE FOR ABRASIVES

James W. Barnett, Chicago, Ill., and Frederick E. Gillett, Hammond, Ind., assignors to E-Z-On Corporation, Chicago, Ill., a corporation of Illinois Application March 18, 1953, Serial No. 343,073

2 Claims. (Cl. 137—541)

This invention relates to a check valve for fluid flows, particularly for liquid flows with abrasive solids therein.

In valve of this type it is a general object to avoid the use of relatively movable solid parts and surfaces, because the abrasives tend to injure such parts and surfaces.

Another general object of such valves is that they should be simple, small, freely adaptable to different types, volumes and directions of flow, easy to disassemble and reassemble, and free from flow-restricting or solids-accumulating tendencies.

These objects have been achieved by the new valve design without compromise and substantially without limitation. Previously such objects were achieved only subject to severe compromise and limitation. The efficiency of the new valve accordingly compares favorably with that of earlier valves for the same service. At the same time the first cost and maintenance cost of the valve has been kept very low.

These improvements have been achieved mainly by the use of a pair of novel rubber springs, supporting and actuating a suitable valve disk or plunger. Each rubber spring has generally a wheel-shaped form. Devices of such form of course are known in many other fields; even valve springs of such form have been used, occasionally, but subject to differences both of form and function, and in valve operations and service fields different from the present one.

In the present field, there is practically only one type of check valve, suitable for flows with abrasive materials therein. It utilizes a rubber or rubberized ball or the like, freely resting on a suitable valve seat by gravity. Such valves require substantially vertical orientation of the flow. The new valve is free from this limitation, thereby greatly improving the efficiency as well as the economy of a flow system.

The foregoing objects, features and advantages will be understood more clearly upon the study of a preferred embodiment of the new check valve, described hereinafter with reference to the drawing wherein Figure 1 is a longitudinal section through the valve.

Figure 1:
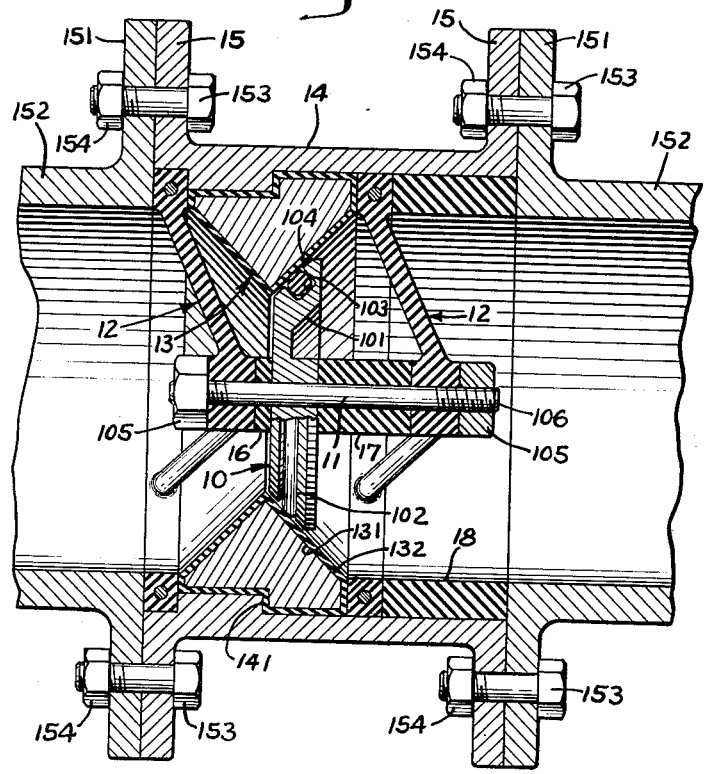

The disk or plunger 10 of the new valve is mounted on a rod 11 which is supported and actuated by a pair of wheel-shaped spring units 12, one at each end of the rod. A Venturi-shaped valve seat 13 for the disk 10 is inserted in a valve housing 14, the letter being illustrated as a short tube with terminal flanges 15. In order to obtain proper longitudinal spacing between the valve disk 10 and seat 13, the rod 11 may have washers 16 and/or sleeves 17 interposed thereon, between the valve disk and the central or hub portions of the spring units. On the other hand washers or sleeves 18 may be inserted peripherally in the tubular valve body 14, in order to space and clamp the outer or rim parts of the spring units and valve seat in proper position.

The valve disk 10 preferably comprises a central stainless steel disk casting 101, which has close fit on an innermost stainless steel rod 11. An O-ring 102 is partly inserted in an annular groove 103, formed in a generally peripheral, conically beveled part 104 of the disk casting, with partial projection of the O-ring 1002, opposite the downstream flare 131 of the Venturi-shaped seat 13. This flare 131 and preferably the entire surface of the seat 13 has a rubber coating 132, suitably selected to withstand mechanical abrasion and chemical attack and to avoid sticking together with the O-ring 102. The core of the seat 13 and the body of the tube 18 and flanges 15 may be of cast iron, while the washers or spacers 16, 17 and 18 may be of hard rubber. The peripheral parts 12, 13 and 18 are clamped together by longitudinal pressure; and such pressure is applied to said parts by the end flanges 151 of the conduit 152 wherein the valve is inserted, the flanges 15 and 151 being secured together by bolts 153 and nuts 154. A shoulder 141 may be provided in the tubular valve body in order to position the valve seat 13 at a predetermined location and to avoid crushing pressure upon either of the rim areas of the spring units regardless of operating pressures and conditions. The central parts 10, 11, 12, 16 and 17 are clamped together by nuts 105, assembled with screw-threaded end parts 106 of the rod 11.

The two wheel-shaped spring units 12 are preferably identical molding of soft stretchable rubber, either natural or synthetic; the term rubber being intended herein to cover all materials which are functionally equivalents of natural of synthetic rubber as to performance features important for the present application. Each unit as shown has a peripheral rim 121, of approximately square cross section, with a reinforcing steel insert ring 122 molded into said rim. Integrally molded with the soft rubber rim, each unit as shown has three radial spokes or spring elements 123, substantially composed of unreinforced soft rubber, although four and sometimes five or more such elements can be used, and reinforcements not unduly interfering with required stretching and flexing operations can be provided. The inner ends of the spring elements 123 are integrally interconnected by a soft rubber hub 124, having a central hole 125 for the shaft 11. In some instances, hard rubber parts may be utilized instead of the soft rubber rim and hub 121, 124. However, soft rubber parts are preferred, not only in view of the greater simplicity of molding them together with the soft rubber spokes 123 but also for more particular mechanical reasons. When the nuts 105 are tightened on the central rod 11, the soft rubber hubs 124 are compressed; they may then act as spring washers, locking the nuts against loosening due to wear and tear. Likewise, when the peripheral bolts and nuts 153 and 154 are tightened on the flanges 15 and 151 the rims 121 are compressed so that they serve to either supplement or replace conventional gaskets between said flanges. Some compression and gasketing action of this kind may also be exhibited by the sleeves or washers 18.

Figure 2:
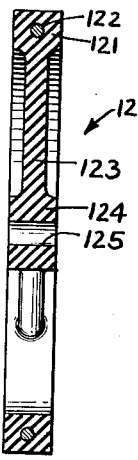
Figure 2 shows one of the rubber springs in a view similar to that of Figure 1.
Figure 3:
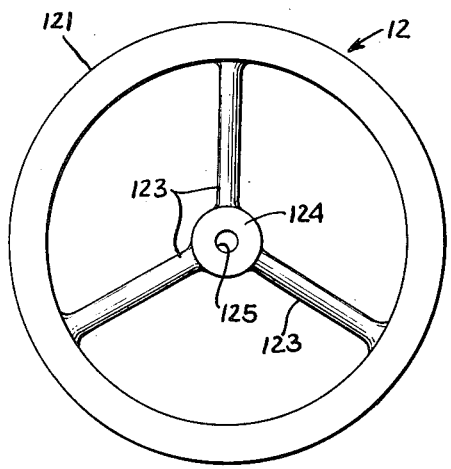
Figure 3 shows the rubber spring in a view at right angles to Figure 2.

As molded the spring units 12 are generally flat as best shown in Figure 2. As installed they form what can be called a cone skeleton; that is, the hubs 124 are axially displaced relative to the rims 122, thereby pre-stressing the spring elements or spokes 123 and pre-loading the valve disk 10 against the seat 13 to a predetermined extent. In operation the spokes or spring elements 123 can be stretched to a greater extent than is shown in Figure 1, within their limits of elastic behavior.

The disk assembly 10, 11, 16, 17 and 105 is supported and at least approximately centered, opposite the seat 13, by the rubber springs 12, in all operative conditions of the valve. When closed the valve disk and seat 10, 13 are substantially self-centering due to the guiding effect of the flaring seat surface 131 upon the disk ring 102.

Assuming now that fluid with abrasives and the like is present in the duct 152, with excess pressure at the left side as shown. When the pressure reaches a predetermined value it begins to open the valve, and fluid with abrasives begins to flow between the rubber spokes 123, and to pass between the rubber O-ring 102 and the rubberized seat surface 131. Depending on pressures and materials involved, the valve may open to a greater or lesser extent. The more it opens, the more the pressures upstream and downstream of the valve are equalized, and the lesser is the remaining force tending to open the valve wider. Thus the rubber spokes or spring elements 123 are inherently protected from over-stressing and over-stretching if they are properly selected and dimensioned for the valve service in question. For instance three spokes of circular cross section, with a diameter of ¼ inch, have been found adequate for typical service in a high pressure line for porcelain enamel slip.

Assuming now that the excess pressure at left drops to a low or negative value or that excess pressure develops at right, this tends to close the valve. On actual closure, abrasives and/or other solids may be caught between the rubber surfaces of the disk and seat 10, 13. This has no adverse effect if the rubber linings and rings are properly selected and dimensioned for the valve service in question. For instance an O-ring 102 with a circular cross section of ¼ inch diameter has been found adequate for typical service on porcelain enamel slip; and a seat lining 132 of 1/16 inch thickness has been found similarly adequate.

Attention may now be drawn to the complete absence of solid parts and surfaces, mainly metal parts and surfaces, in frictional contact and motion during any phase of the operation. It was the presence of such parts and surfaces which played havoc with known abrasive check valves. It is largely due to the absence of such parts and surfaces that the new valve is a success. Of course even prior check valves avoided frictional contact and motion of solid parts if unguided valve balls or the like were used. This however was possible only with a generally vertical, upward fluid flow through the valve, whereas the new valve can have horizontal flow or any other flow. Attempts have been made in the past to press a valve ball horizontally against the valve seat, instead of relying upon vertically downward gravitational seating; however the only known prior device, basically capable of such operation, was a tapering coil spring, inherently requiring the use of thin metal parts within the stream of abrasive materials. The service life of such springs was extremely short and in most cases the construction was entirely unsuitable for the service conditions outlined. The new valve by contrast is perfectly suitable for service with abrasives.

Figure 4:
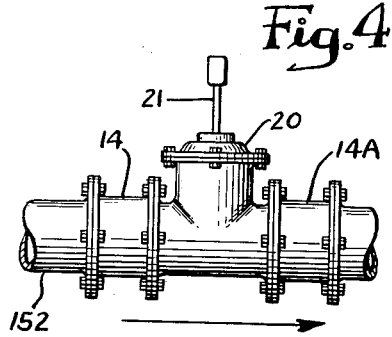
Figures 4 shows a typical manner of installing the valve.

A pair of the new valve housings 14, 14A may form the suction inlet and discharge outlet of a suitable pump 20 in a conduit 152 for abrasive material, as best shown in Figure 4. During an upward stroke of the pump rod 21 the inlet valve 14 is open and the outlet valve 14A closed. During the return stroke the situation is reversed.

In prior pump installations for abrasive bearing fluids the inlet and discharge valves of the pump had to be arranged for upward flow through the same, while of course most of the interconnecting flow lines of industrial plants and the like are basically horizontal. It is obvious to persons skilled in the art that great advantages are obtained by the straight through flow that can be used with the new valve, as shown in Figure 4; for instance costs of installation and operation are reduced, pumping efficiency is raised, and the service life of the entire conduit, including not only the valves but also fittings and the like, is greatly lengthened.

The upstream rubber spring 12 or sometimes the downstream rubber spring 12 can be dispensed with, if the central disk and rod unit is suitably balanced relative to the remaining single rubber spring, by a counterweight or the like. However the double spring construction shown is preferred, since it involves the use of less mass and therefore readier and better response to pressure actuation. It is also possible in special cases to use more than two rubber springs, in series with one another, particularly when more than one valve disk is involved; however the construction for each valve disk usually will be that which has been described and explained.

Still other modifications undoubtedly will occur to persons skilled in the art, upon a study of this disclosure.

What is claimed is:

1. In a check valve, a valve housing, a valve seat therein, a valve disk opposite the seat, at least one generally wheel-shaped spring unit for the support and actuation of the valve disk, comprising a rim secured within the housing, a hub secured to the disk, and a series of angularly spaced, resilient spokes, pre-stressed into the form of a cone skeleton and adapted to be stressed further by the pressure of fluid flow upon the valve disk, a rod, having the disc mounted thereon, said rod axially extending through the opening of the seat, and an annular member of material such as hard rubber, surrounding the rod to space the disc from the hub.

2. A check valve as described in claim 1 wherein the spokes of the spring unit substantially consist of soft unreinforced rubber, whereas the rim of the spring unit substantially consists of soft reinforced rubber.

References Cited in the file of this patent

UNITED STATES PATENTS

| Number | Name | Date |
|---|---|---|
| 326,613 | Whittaker | Sept. 22, 1885 |
| 508,464 | Branden | Nov. 15, 1893 |
| 1,002,938 | Stange | Sept. 12, 1911 |
| 1,992,043 | Saunders | Feb. 19, 1935 |
| 2,082,606 | Woodbridge | June 1, 1937 |
| 2,170,478 | Long | Aug. 22, 1939 |
| 2,355,862 | Harper | Aug. 15, 1944 |
| 2,490,511 | Courtot | Dec. 6, 1949 |

FOREIGN PATENTS

| Number | Country | Date |
|---|---|---|
| 521,728 | Great Britain | 1940 |